(12) United States Patent
Zamuner

(10) Patent No.: US 6,940,041 B2
(45) Date of Patent: Sep. 6, 2005

(54) ERGONOMIC HANDLE ATTACHMENT FOR WELDING TORCH

(75) Inventor: Frank Zamuner, Oakville (CA)

(73) Assignee: Lincoln Global, Inc., Monterey Park, CA (US)

( * ) Notice: Subject to any disclaimer, the term of this patent is extended or adjusted under 35 U.S.C. 154(b) by 113 days.

(21) Appl. No.: 10/640,057

(22) Filed: Aug. 14, 2003

(65) Prior Publication Data

US 2004/0031781 A1 Feb. 19, 2004

Related U.S. Application Data

(63) Continuation-in-part of application No. 09/794,494, filed on Feb. 28, 2001, now Pat. No. 6,610,963.

(51) Int. Cl.[7] .................................................. B23K 9/28
(52) U.S. Cl. ........................ 219/144; 219/136; 219/141
(58) Field of Search ........................... 219/136, 137.31, 219/138, 139, 141, 142, 144

(56) References Cited

U.S. PATENT DOCUMENTS

| | | | | |
|---|---|---|---|---|
| 1,296,358 A | * | 3/1919 | Bowers | 219/144 |
| 2,118,274 A | * | 5/1938 | Sweda | 219/142 |
| 2,395,214 A | * | 2/1946 | Bourque | 219/142 |
| 2,428,138 A | * | 9/1947 | Blakemore | 219/138 |
| 2,438,792 A | * | 3/1948 | Sandrik | 219/138 |
| 2,540,204 A | * | 2/1951 | Holslag | 219/141 |
| 2,558,083 A | * | 6/1951 | Green | 219/138 |
| 4,161,643 A | * | 7/1979 | Martin et al. | 219/138 |
| 4,174,062 A | * | 11/1979 | Francis | 219/144 |
| 5,854,461 A | * | 12/1998 | Sorenson | 219/136 |
| 6,069,340 A | * | 5/2000 | DeCanio | 219/138 |

\* cited by examiner

Primary Examiner—Clifford C. Shaw
(74) Attorney, Agent, or Firm—Fay, Sharpe, Fagan, Minnich & McKee, LLP

(57) ABSTRACT

An over-handle is mounted on a rotor-ring for rotation around the handle of the torch. The accessory is for use with a torch of the kind in which a (coated) electrode is mounted in an electrode holder, and is tightened therein by the welder screwing the holder into the torch handle. The orientation of the electrode relative to the handle is unpredictable, and the rotatable over-handle enables the over-handle to be orientated to suit the orientation of the electrode. A rotatable accessory in the form of a pick hammer is also disclosed.

35 Claims, 8 Drawing Sheets

ERGONOMIC HANDLE ATTACHMENT FOR WELDING TORCH

This is a Continuation-in-Part of patent application number U.S. Ser. No. 09/794,494, filed Feb. 28, 2001, now granted/issued as patent number 6,610,963.

This invention relates to torch-mounted accessories for improving the operation and performance of a welding torch.

BACKGROUND TO THE INVENTION

The invention is particularly applicable to the kind of torch in which:

an electrode is clamped into an electrode holder;

the clamp is tightened by screw thread action;

the screw thread is between the electrode holder and a cylindrical torch-handle;

and the orientation at which the electrode holder comes to rest on the torch-handle, upon tightening, can vary unpredictably, for example due to the replacement of a spent electrode with a new one of slightly different dimensions—and of course the welder might apply more or less tightening force to the new electrode.

GENERAL FEATURES OF THE INVENTION

The invention provides that the accessory is rotatable on the torch-handle. As a result, for example, the accessory can be rotated to the appropriate orientation for best operational convenience of the accessory, once the orientation of the electrode holder (and the electrode) have been set.

Preferably, the accessory comprises an over-handle, of the kind used to relieve gripping stress in the hand of the welder.

DETAILED DESCRIPTION OF PREFERRED EMBODIMENTS

By way of further explanation of the invention, exemplary embodiments of the invention will now be described with reference to the accompanying drawings, in which.

Figure 2:
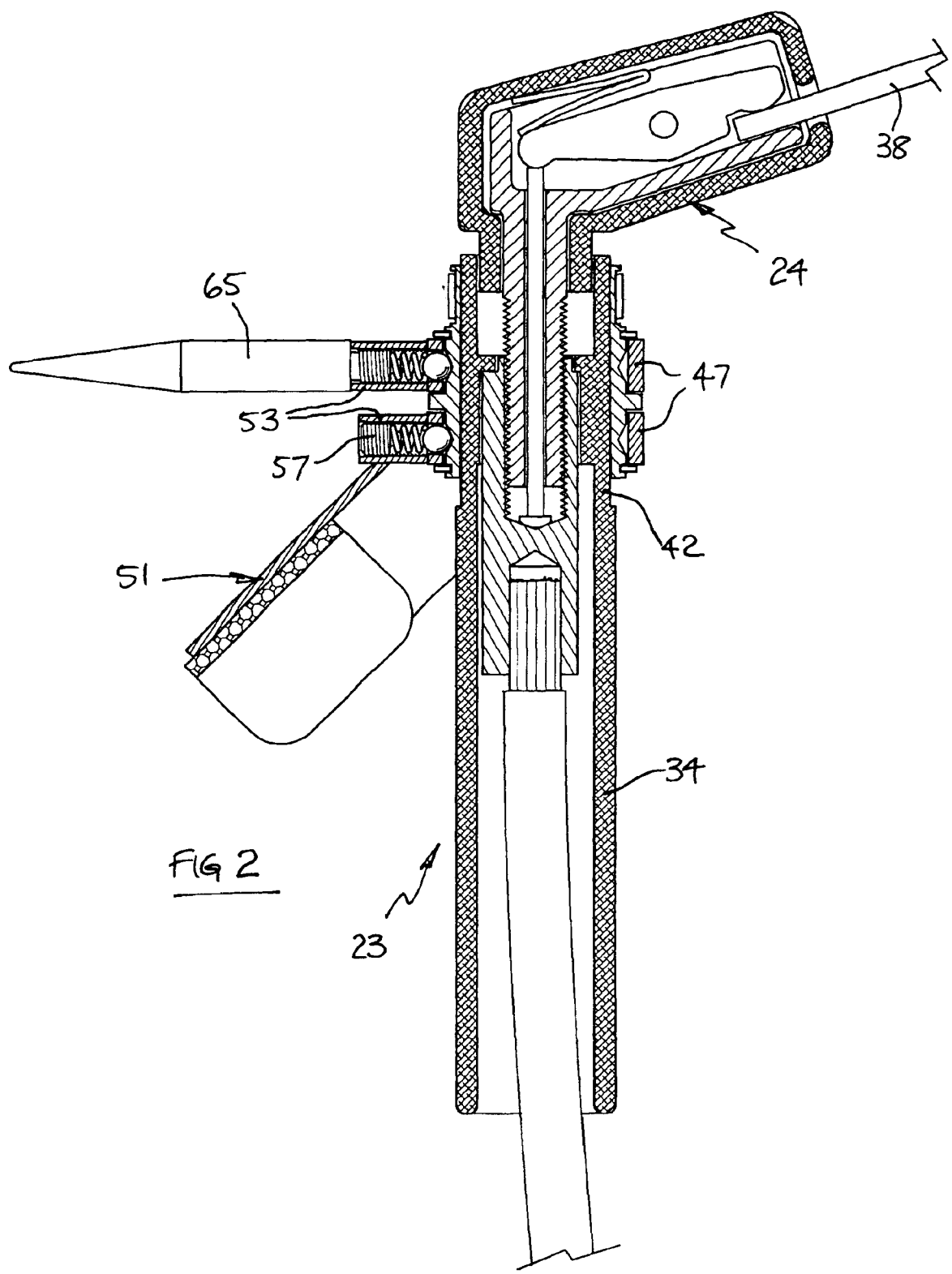
FIG. 2 is the same cross-section, but shows rotatable accessories mounted on the torch handle, in accordance with the invention.
Figure 3:
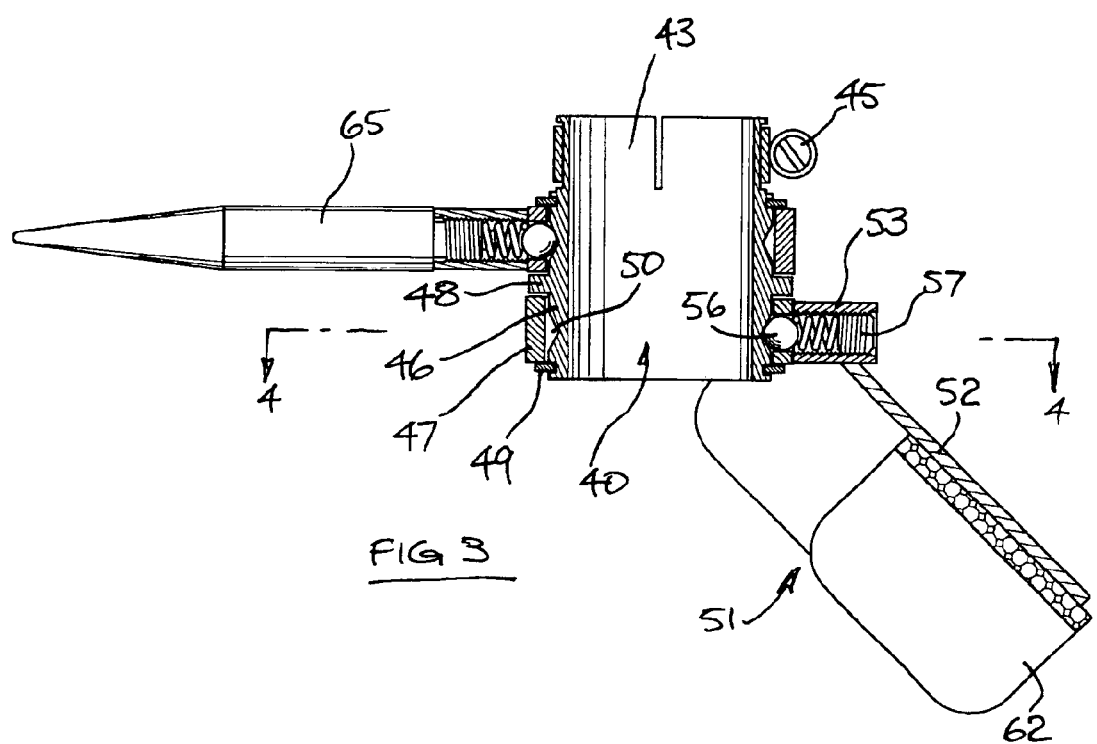

FIG. 3 cross-section of the accessory shown in FIG. 2.

Figure 4:
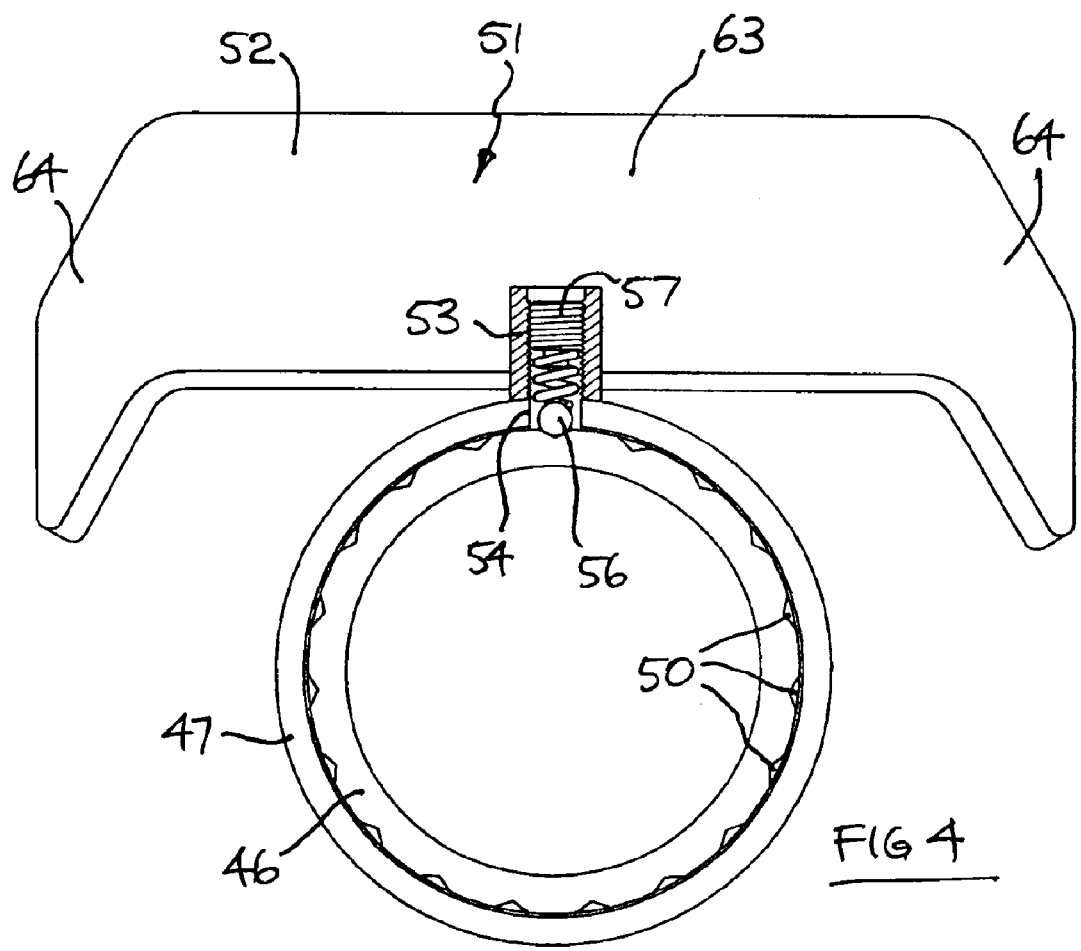

FIG. 4 is a cross-section on line 4—4 of FIG. 3.

Figure 5:
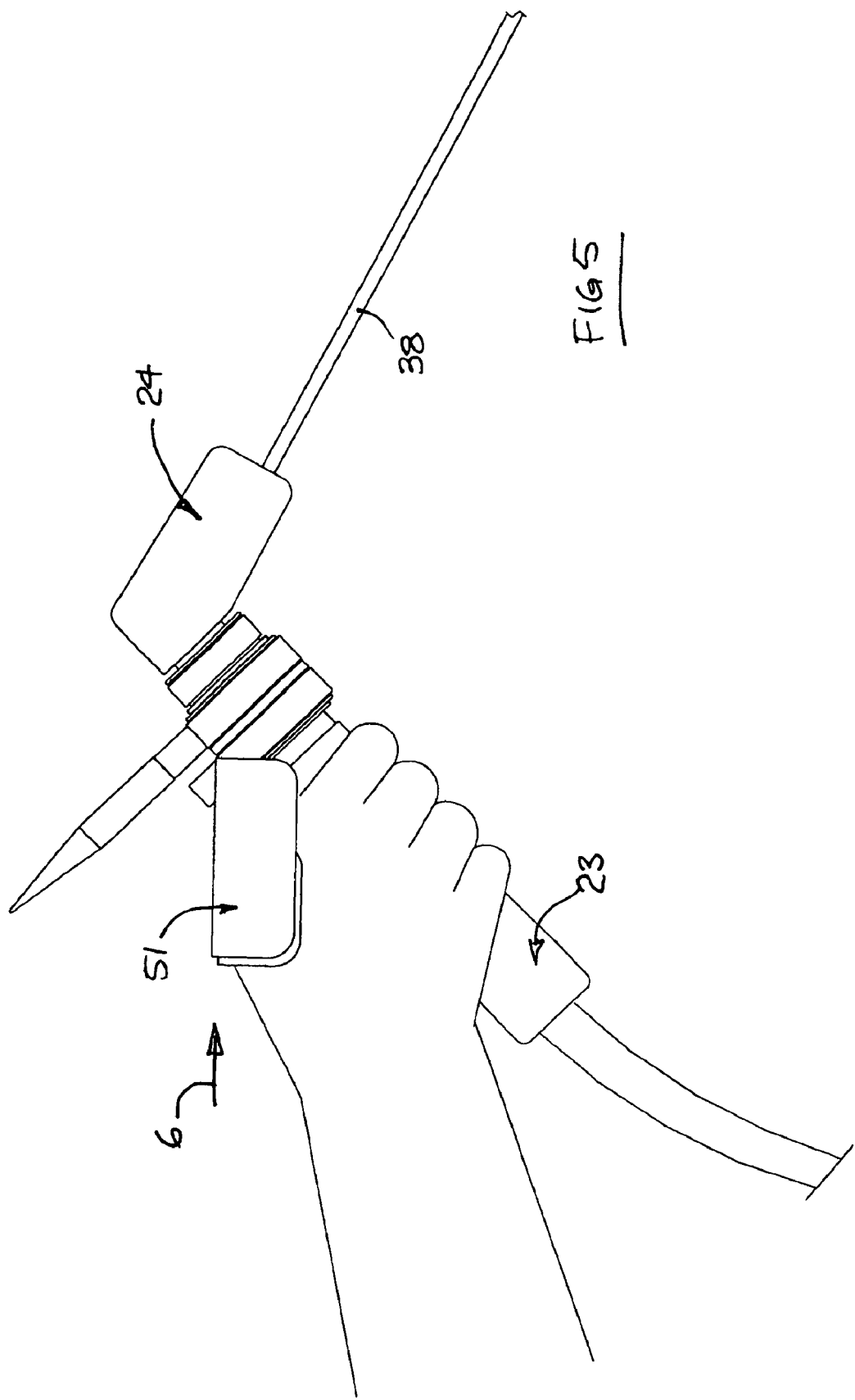

FIG. 5 is a side view of the torch of FIG. 2, in use.

Figure 6:
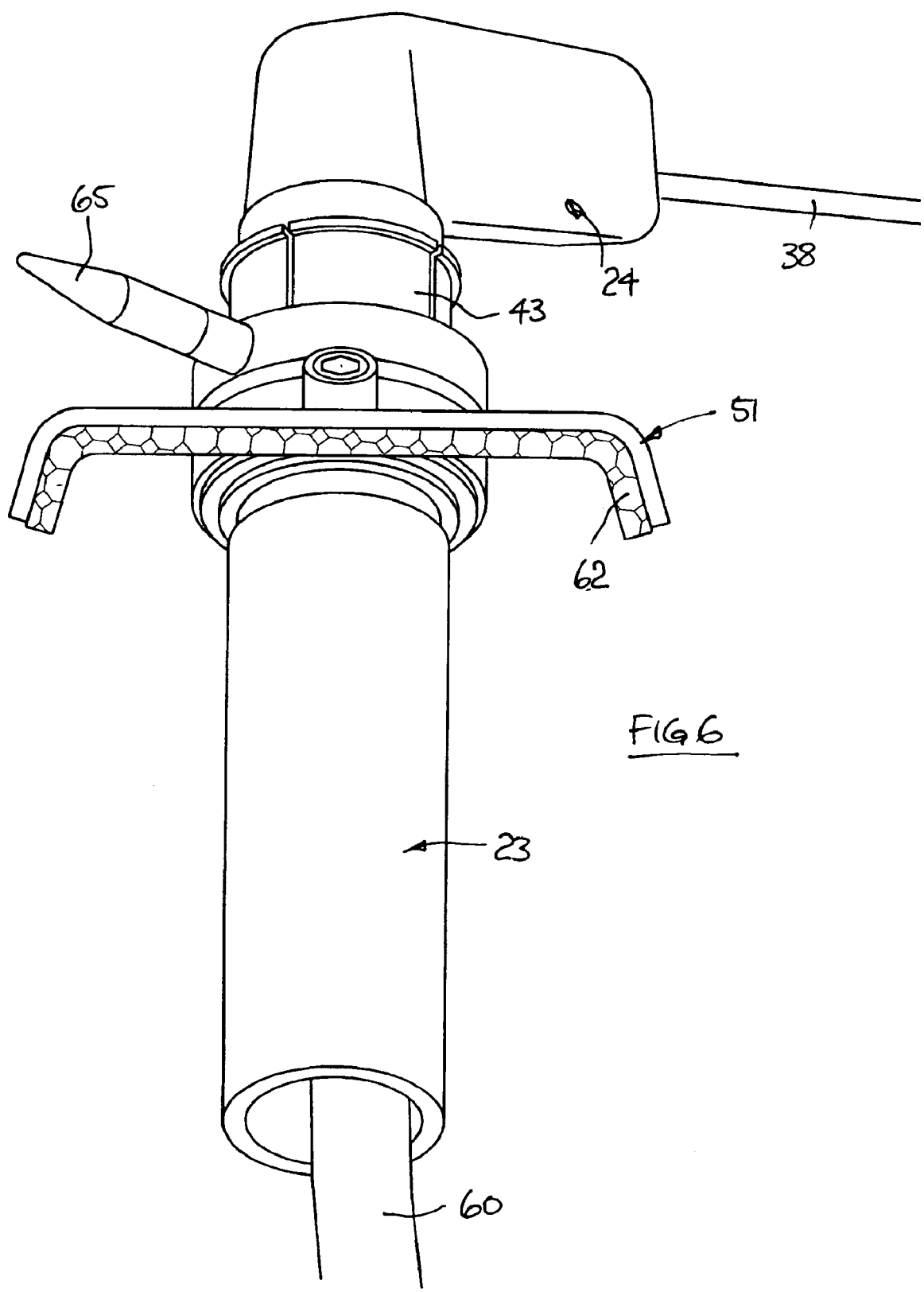

FIG. 6 is a view in the direction of arrow 6 of FIG. 5, showing a possible condition of the torch.

Figure 7:
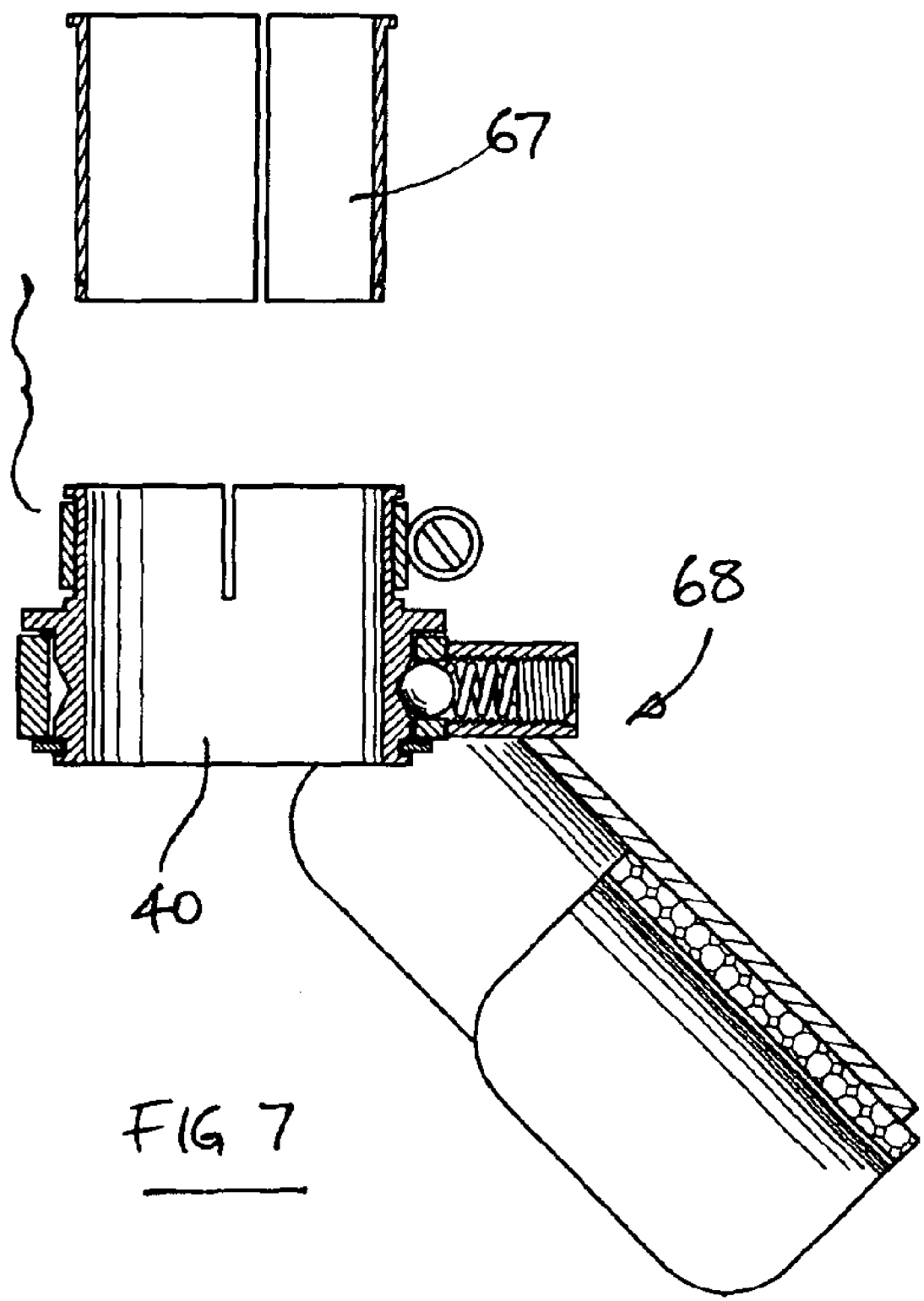

FIG. 7 is a view of another rotatable accessory that accords with the invention.

Figure 8:
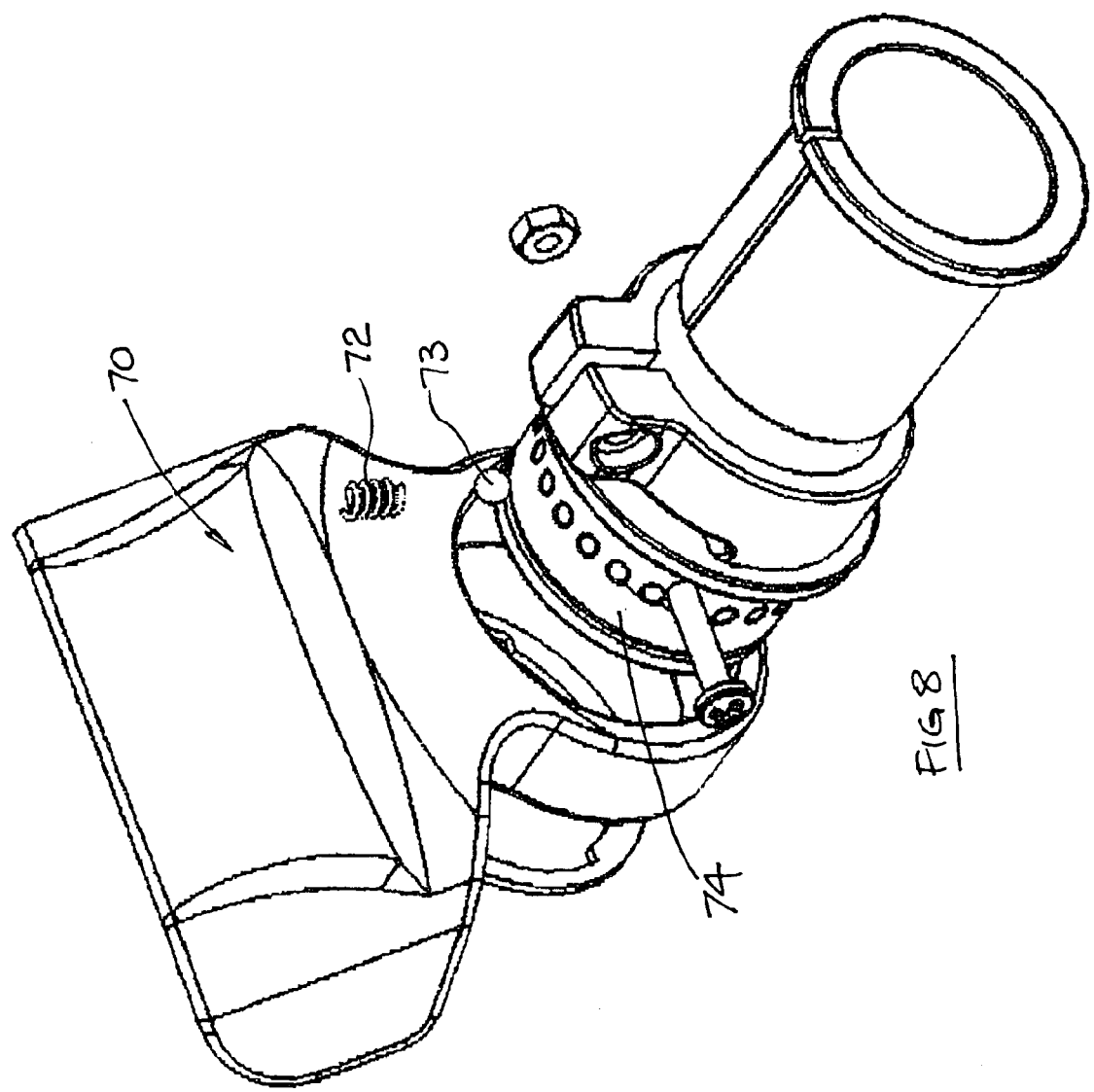

FIG. 8 is a pictorial view of another rotatable accessory that accords with the invention.

The apparatuses shown in the accompanying drawings and described below are examples which embody the invention. It should be noted that the scope of the invention is defined by the accompanying claims, and not necessarily by specific features of exemplary embodiments.

Figure 1:
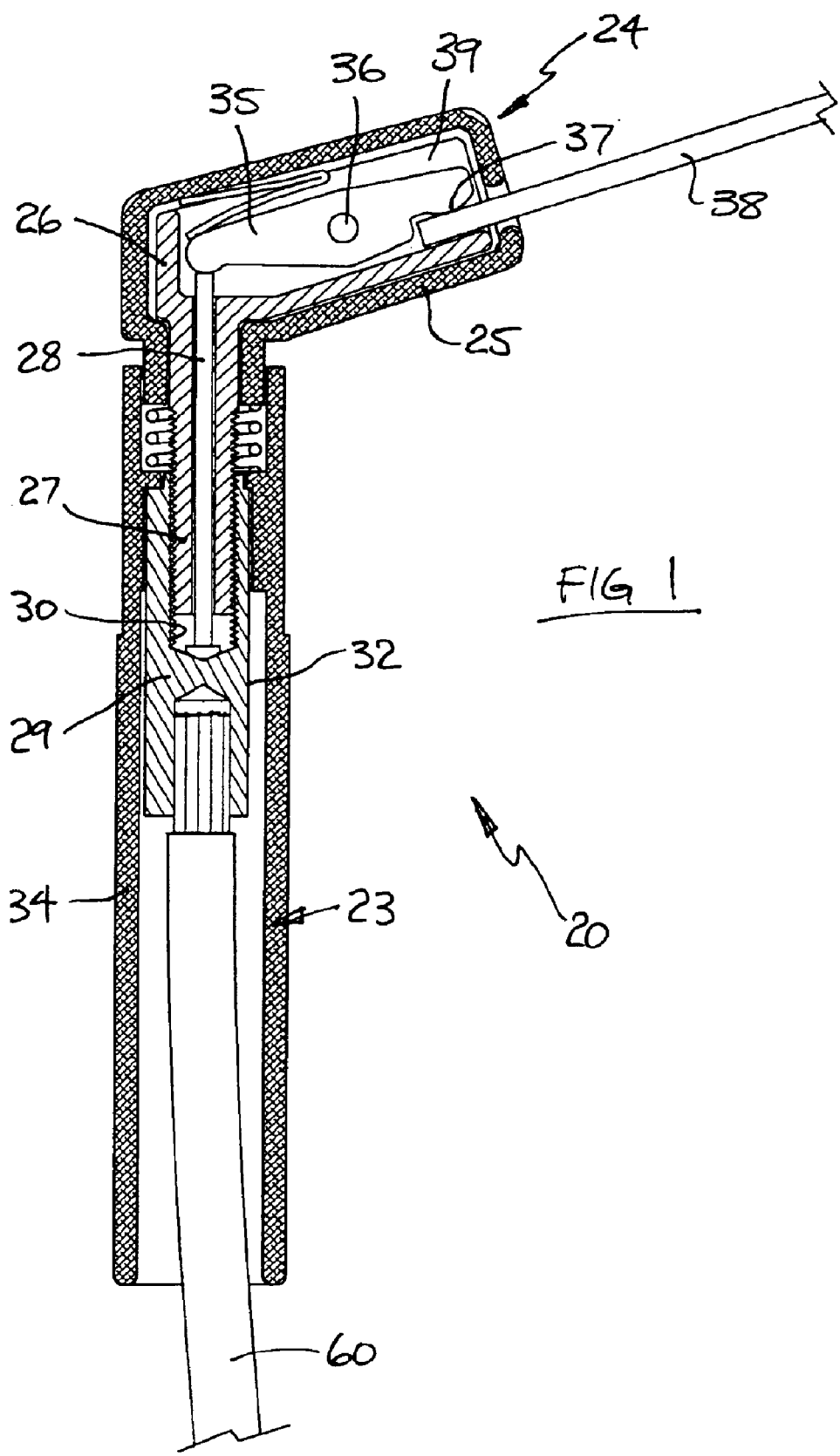
FIG. 1 is a cross-section of a known type of welding torch, in which a (coated) electrode is gripped in an electrode-holder.

As shown in FIG. 1, the torch 20 includes a handle 23, in the form of a cylindrical tube of plastic material. An electrode holder 24 comprises a plastic body 25, in which is housed a brass insert 26. The brass insert 26 has a threaded stem 27. The stem 27 is hollow, and a push rod 28 is slidable therein.

In the handle 23 of the torch 20 is a brass fitting 29, which is formed with a female thread 30, complementary to the threaded stem 27. The fitting 29 is made from hexagonal bar, at 32, and the plastic handle body 34 is moulded with an internal hexagonal form, sized to prevent relative rotation between the fitting 29 and the handle body 34.

The structure of the torch 20 is such that, when the holder 24 is rotated about the handle 23, the holder 24 screws into the handle 23. This action drives push rod 28 effectively upwards relative to the holder 24, which causes lever 35 to rock about pin 36, and causes the tappet 37 to clamp the electrode 38 firmly against the internal trough 39 of the brass insert 26. Thus, when the electrode 38 is finished, the welder unscrews the holder 24 from the handle 23, by hand; this relieves the push rod 28 and lever 35, whereby the stump of the electrode drops away. The welder inserts a new electrode into the holder, and screws the holder back down into the handle, until the new electrode is gripped tightly.

The welder stops screwing the electrode holder 24 into the handle 23 at the point where the new electrode 38 is gripped tightly. But probably, the orientation at which the holder 24 comes to rest relative to the handle 23, with this new electrode, is different from the orientation at which the holder came to rest in respect of the previous electrode, now discarded. The handle 23 is a right cylinder, so the fact that the holder 24 now lies orientated to the north of the handle axis, instead of to the west, is immaterial as far as the normal operation of the torch is concerned.

Torches of the kind as depicted in FIG. 1, with a right-cylindrical handle 23 and a screw-in electrode holder 24, are in widespread use in industry. The depicted lever clamp arrangement is common, but other mechanisms for clamping and gripping the electrode 38, responsively to the holder 24 being screwed into the cylindrical handle 23, are often encountered.

The rotatable accessory of the present invention is for use with torches of this type, in which the orientation at which the electrode holder 24 comes to rest is unpredictable.

An example of a rotatable accessory that embodies the invention is shown in FIG. 2. A stator sleeve 40 is annular in form, and is sized and adapted to slide axially over the plain cylindrical upper end 42 of the handle body 34. An upper extension 43 of the stator sleeve 40 is slit, and is clamped by means of a circumferential screw clamp 45 onto the end 43.

The stator-sleeve 40 includes a stator-ring 46. A rotor-ring 47 is assembled over the stator-ring 46, and the rotor-ring 47 is held in place, against a shoulder 48, by means of a circlip 49. The rotor-ring 46 is adapted and dimensioned for guided rotation around the stator-ring 46.

The outer surface of the stator-ring is formed with a series of indentations or sockets 50, which will be described below.

An over-handle 51 is attached to the rotor-ring 47. A post 53 is welded to the outer surface of the rotor-ring 47, and the handle-plate 52 that forms the main part of the over-handle is shaped to partly slip over the post 53, and partly engage the outer surface, and the handle-plate is welded to the post 53 and the rotor-ring surface.

The rotor-ring 47 is provided with a through-hole 54, which contains a ball 56. The post 53 is threaded inside, and carries a grub-screw 57. The grub-screw presses down on the ball 56, and presses the ball into the indentation or socket 50. The arrangement serves as a rotational detent. In order for the rotor-ring 47 to rotate, the ball 56 has to ride up, out of the indentation 50, against spring 59. Thus, when the welder comes to rotate the rotor-ring, the effort required to do so varies from very light when the rotor ring is moving such that the ball is entering into one of the indentations, to much heavier when the ball is riding up and out of the indentation.

It is recognised that the detent mechanism can readily be made such that the resistance due to the spring will hold the rotor-ring against rotation, normally, unless the welder forcefully turns the rotor-ring; and yet the resistance is light enough that the welder can easily turn the rotor-ring with their hands.

The over-handle 51 is very effective in relieving the muscle strain a welder feels after a period of time manipulating the torch 20. The strain arises because the heavy service cable 60 is a constant drag on the torch, and because the welder must hold the torch steady all the time during operation. One of the main reasons for the muscle strains associated with welding is that the welder must be constantly exert a strong clasping or gripping force around the torch handle. Thus, the strain on a welder's hand arises mainly from the fact that the hand is exerting a grip, rather than from the weight of the torch, as such. Carpal tunnel syndrome is a predominant disability of welders, and it arises mainly because of the welder's need constantly to exert a squeeze-grip on the torch handle.

To operate the torch, the welder places their hand around the tubular handle 23, with the fingers on one side and the thumb on the other side (FIG. 5). The presence of the over-handle 51 means that the first web area of the hand, i.e the web area between the thumb and the forefinger, lies between the torch-handle 23 and the over-handle 51. The over-handle slopes back at an angle of about forty-five degrees, and the effect is that the welder can now control and manipulate the torch simply by resting the first web area under the over-handle.

That is to say, the welder can exert enough physical control of the torch, to manipulate the torch during welding operations, without needing to grip the torch handle. Of course, generally, the welder will exert a light grip on the torch handle, rather than leave the fingers completely loose, but the point of the over-handle is that the welder is relieved of the constant need, all the time, to exert a strong gripping or clasping force on the torch handle. The presence of the over-handle means the welder can maintain proper manipulative control over the torch with the gripping/clasping muscles of the hand in a more or less relaxed state, whereby the welder can continue operations for many hours without suffering disabling hand fatigue and strain.

The principle of the ergonomic over-handle for a welding torch is described in detail in patent publication CA-2,338,949.

When carrying out a welding operation (see FIG. 5), the welder's wrist and arm lie on the other side of the torch-handle 23 from the electrode 38. Thus, the requirement arises for the over-handle 51 to be on the opposite side of the torch from the electrode. In fact, the over-handle 51 should be more or less diametrically opposite the electrode 38. It would be unacceptable if the over-handle 51 were to lie at an angle that was substantially different from 180 degrees relative to the electrode. (See FIG. 6. It will be understood that the welder really cannot conduct welding operations if the electrode 38 is left protruding at the as-illustrated odd angle to the right, relative to the over-handle 51.)

However, as mentioned, the orientation of the electrode holder 24 at which the holder comes to rest, relative to the handle, is not predictable. As mentioned, this is because proprietary welding electrodes vary as to their diameter, and welders vary as to the pressure they use to tighten the tappet 37 in the holder 24 down onto the electrode 38.

It may happen that, at the point where the electrode has become fully tightened into the holder, the electrode and the over-handle do not lie diametrically opposite each other on the handle, but instead lie at some odd angle relative to each other. In fact, relative to the handle 23, the angle the electrode 38 makes when it comes to rest (i.e when the electrode becomes tight), may be regarded as simply random.

Because the orientation of the electrode 38 can vary relative to the handle 23, and because the over-handle 51 needs to lie preferably diametrically opposite the electrode 38, therefore the structure of the torch should be such that the orientation of the over-handle 51 can be varied, relative to the handle. The over-handle 51 is rotatable on the handle 23, to accommodate this desideratum. Upon inserting a new electrode, the welder tightens the holder 24 down into the handle 23, until the new electrode is tightly gripped; then, they simply spin the over-handle 51, on the rotor-ring 47, to an orientation that is diametrically opposite where the electrode came to rest. The detent mechanism is so constructed that the welder can easily turn the over-handle by hand action, and yet the over-handle remains firmly in the as-set orientation. It remains there until the welder moves it to a new orientation.

The over-handle-plate 52 is of sheet metal (aluminum), bent to shape, and welded to the post 53. A piece 62 of foam rubber is glued to the over-handle-plate. This provides some comfort, and also increased friction to assist the welder in manipulating the torch when exerting only a very light grip on the handle. In the example as illustrated, the central flat area 63 of the over-handle-plate, i.e the area left between the left and right bent-over sides 64, was seven cm wide. The foam rubber was ten mm thick. The over-handle-plate made an angle of forty-five degrees relative to the axis of the handle 23, and its length in the FIG. 5 view was five cm.

The torch 20 as shown has also been furnished with another rotatable accessory, namely the rotatable pick 65. When welding, it is often a requirement for the welder, immediately after completing a weld, to chip away the oxide slag that has built up around the weld, and a suitable small pick hammer should be part of the welder's toolkit, for this purpose. However, a separate pick hammer tool can become lost; also, if separate, the welder has to set down the torch, and then take up the pick hammer, which can be tiresome and disruptive to smooth operations.

As shown, the pick 65 is attached to the torch, and the welder can bring the pick into operation without setting the torch down. When the welder is using the pick to clean a weld, generally they will be disposed to orientate the pick more or less diametrically opposite the electrode, so the electrode is out of the way during the hammering action. At the same time, the welder will be disposed to set the over-handle now in line with the electrode, for ease of manipulation of the torch now as a pick-hammer. Thus, the rotatable over-handle and the rotatable pick now lie in the orientations as will be understood from FIG. 3.

The pick 65 had a length of nine cm from the axis of the handle, and a diameter of thirteen mm. Alternatively, the pick may be provided with a chisel-shaped end. Generally, it is not preferred that the pick be removable from the rotor-ring, because the pick might tend to work loose in that case.

Even without a rotatable over-handle, it can be beneficial to provide a rotatable pick on the torch, so that the pick can be out of the way while the torch is being used for welding, and the electrode can be out of the way when the pick is being used. When the rotatable over-handle is also present, the orientations of these accessories can be set and re-set quickly and conveniently, and the improvement in smooth operation, overall, i.e including both welding and picking, is quite noticeable.

FIG. 7 shows a rotatable accessory which includes only an over-handle, but no pick. That can be beneficial where the welder does prefer to use a separate pick-hammer tool for the picking action.

FIG. 7 shows also a split sleeve 67. This sleeve would be supplied with the rotatable accessory 68. The sleeve optionally fits inside the stator-sleeve 40 of the accessory, and enables the accessory to be used with a (cylindrical) handle of somewhat slimmer dimensions. However, generally, proprietary torch handles vary only very slightly as to diameter—because of course they all have to cater for the same range of sizes of welders' (gloved) hands.

FIG. 8 shows an over-handle of an assembly-structure that is fabricated as a one-piece casting or moulding. In FIG. 8, the over-handle 70 is moulded in plastic. The rotor-ring and the over-handle are combined together in the one-piece moulding. A recess for receiving the spring 72 and ball 73 is formed as a blind hole within the shape of the over-handle. Thus, a post is not required, nor a grubscrew. The stator-ring 74 for use with the one-piece over-handle assembly-structure may be substantially the same as the stator ring 46 of the previous drawings.

What is claimed is:

1. An apparatus including welding torch, having a service cable, wherein:
    the torch includes a torch-handle, and includes an over-handle mounted on the torch-handle;
    the over-handle, so mounted, is guided on the torch-handle for rotation about a rotation-axis of the torch-handle;
    wherein the over-handle and the torch handle are positioned to create a space for receiving a web area of a person's hand;
    the over-handle is functionally operable, and its manner of operation is such that the efficacy thereof is substantially affected by the orientation of the over-handle relative to the torch-handle;
    a stator-ring is fixedly secured to the torch handle;
    a rotor-ring is fixedly secured to the over-handle;
    wherein the stator-ring and the rotor-ring are so structured, mutually, that the rotor-ring is guided for, and constrained against, all modes of movement relative to the stator-ring, other than rotation about the rotation-axis of the torch-handle;
    the over-handle includes a detent mechanism, which defines N detent-orientations of the rotor-ring upon the stator-ring;
    in respect of each one of the N detent-orientations;
    when the rotor-ring lies at the detent-orientation, the detent mechanism provides a heavy resistance to rotational movement of the rotor-ring away from the detent-orientation;
    when the rotor-ring lies close to the detent-orientation, the detent mechanism provides a large resistance to rotational movement of the rotor-ring in the direction away from the detent-orientation, and provides a small, or negative, resistance to rotational movement of the rotor-ring in the direction towards the detent-orientation.

2. The apparatus of claim 1, wherein, in respect to each one of the N detent-orientations, the said heavy resistance;
    is weak enough that the rotor-ring can be rotated, against the heavy resistance, by hand manipulation, away from the detent-orientation; and
    is strong enough, in the absence of hand manipulation thereof, to hold the rotor-ring, with the accessory secured thereto, at the detent-orientation.

3. The apparatus of claim 1, wherein:
    the stator-ring includes N indentations, respective to the N detent-orientations;
    the rotor-ring includes a ball and spring assembly, which is so structured that, upon the rotor-ring being rotated upon the stator-ring, the ball enters into, and rises out of, the N indentations, one by one, being urged into the indentations by action of the spring.

4. The apparatus of claim 1, wherein the detent-orientations are equally pitched circumferentially about the stator-ring, and the number N is about twenty.

5. The apparatus of claim 1, wherein the torch-handle includes a cylindrical portion, which is suitable for being gripped by a person, and the rotation-axis is co-axial with the axis of the cylindrical portion.

6. The apparatus of claim 1, wherein:
    the torch includes an electrode, and an electrode-holder;
    the structure of the torch is such that the electrode can be inserted into the electrode holder, and can be clamped or gripped therein by the action of rotating the electrode-holder relative to the torch handle;
    and the structure of the torch is such that the rotatable accessory can be rotated about the torch-handle while the electrode-holder is held stationary relative to the torch-handle.

7. The apparatus of claim 6, wherein:
    the structure of the torch is such that the electrode-holder can e screwed into and (out of) the torch-handle, and such action is effective to tighten and the electrode in the electrode-holder, respectively;
    the electrode holder is so structured that the electrode, when tightened into the electrode-holder, lies substantially radially with respect to the axis of the torch-handle.

8. The apparatus of claim 6, wherein:
    the action of rotating the electrode-holder relative to the torch-handle, to clamp or grip the electrode therein, takes place about an electrode-holder axis;
    and the electrode-holder axis is co-axial with the rotation-axis of the over-handle.

9. The apparatus of claim 6, wherein the structure of the torch is such that:
    in respect of a first occasion of operation of the torch, the electrode lies at a first electrode-orientation angle relative to the torch-handle, and the over-handle can be rotated to, and left at, a first over-handle-orientation angle relative to the torch-handle;
    in respect of a second occasion of operation of the torch, the electrode lies at a second, different, electrode-orientation angle relative to the torch-handle, and the over-handle can be rotated to, and left at, a second over-handle-orientation angle relative to the torch handle.

10. The apparatus of claim 9, wherein:
    when the electrode lies at the first electrode-orientation angle relative to the torch-handle, and the over-handle lies at the first over-handle-orientation angle relative to the torch-handle, the over-handle thereby lies oriented at a first electrode-over-handle-orientation angle relative to the electrode; and when the electrode lies at the second electrode-orientation angle relative to the torch-handle, and the over-handle lies at the second, different, over-handle-orientation angle relative to the torch-handle, the over-handle thereby lies orientated at a second electrode-over-handle-orientation angle relative to the electrode;

the structure of the torch is such that the first electrode over-handle-orientation angle can be made equal, by hand manipulation of the over-handle, to the second electrode-over-handle-orientation angle.

11. An apparatus, including a welding torch, having a service cable, wherein:

the torch includes a torch-handle, and includes an accessory mounted on the torch-handle;

the accessory, so mounted, is guided on the torch-handle for rotation about a rotation-axis of the torch-handle;

the accessory is functionally operable, and its manner of operation is such that the efficacy thereof is affected by the orientation of the accessory relative to the torch-handle;

a stator-ring is fixedly secured to the torch handle;

a rotor-ring is fixedly secured to the accessory;

wherein the stator-ring and the rotor-ring are so structured, mutually, that the rotor-ring is guided for, and constrained against, all modes of movement relative to the stator-ring, other than rotation about the rotation-axis of the torch-handle;

the accessory includes a detent mechanism, which defines N detent-orientations of the rotor-ring upon the stator-ring;

in respect of each one of the N detent-orientations;

when the rotor-ring lies at the detent-orientation, the detent mechanism provides a heavy resistance to rotational movement of the rotor-ring away from the detent-orientation;

when the rotor-ring lies close to the detent-orientation, the detent mechanism provides a large resistance to rotational movement of the rotor-ring in the direction away from the detent-orientation, and provides a small, or negative, resistance to rotational movement of the rotor-ring in the direction towards the detent-orientation; wherein the accessory comprises an over-handle, fixedly secured to the rotor-ring;

the over-handle extends outwards and rearwards from the rotor ring;

the over-handle overlies, and is spaced from, the torch-handle;

the over-handle is so disposed in relation to the torch-handle as to create a space between the torch-handle and an undersurface of the over-handle;

the space thus created is so shaped and sized as to be capable of, and suitable for, receiving the first web area of the hand of a person, into that space, the first web area being the webbed area between the thumb and the forefinger;

the configuration of the space created between the torch-handle and the over-handle is such that, when the first web area of the hand is located in the said space, the first web area is gripped between the torch-handle and the over-handle securely enough that the person can manipulate and manhandle the torch, with the service cable attached, substantially without exerting any muscular squeeze or grip on the torch-handle.

12. The apparatus of claim 11, wherein:

the space thus created is so shaped and sized as to be capable of, and suitable for, exerting a slight squeeze-grip upon the first web area of a person's hand, when the first web area is located in the said space;

the over-handle is open at the sides of the hand-grip component, to the extent that, when the first web area of a person's hand is located in the said space, the fingers of the hand can lie to the right side of the torch-handle, and the thumb of the hand can lie to the left side of the torch-handle;

the shape of the over-handle is such that, when the first web area of a person's hand is located in the said space, the attachment-component lies in front of the first web area.

13. The apparatus of claim 12, wherein the over-handle includes a plate portion, which extends outwardly and rearwardly with respect to the torch-handle at a suitable angle to the torch-handle as to facilitate the placement of the said first web area of the hand into the space between the plate portion and the torch-handle.

14. The apparatus of claim 13, wherein the plate portion extends outwardly and rearwardly at an angle of about forty-five degrees with respect to the torch-handle.

15. The apparatus of claim 13, wherein the over-handle includes left and right curved over side-portions.

16. The apparatus of claim 11, wherein, in respect to each one of the N detent-orientations, the said heavy resistance;

is weak enough that the rotor-ring can be rotated, against the heavy resistance, by hand manipulation, away from the detent-orientation; and, is strong enough, in the absence of hand manipulation thereof, to hold the rotor-ring, with the accessory secured thereto, at the detent-orientation.

17. The apparatus of claim 11, wherein:

the stator-ring includes N indentations, respective to the N detent-orientations;

the rotor-ring includes a ball and spring assembly, which is so structured that, upon the rotor-ring being rotated upon the stator-ring, the ball enters into, and rises out of, the N indentations, one by one, being urged into the indentations by action of the spring.

18. The apparatus of claim 11, wherein the detent-orientations are equally pitched circumferentially about the stator-ring, and the number N is about twenty.

19. The apparatus of claim 11, wherein the torch-handle includes a cylindrical portion, which is suitable for being gripped by a person, and the rotation-axis is co-axial with the axis of the cylindrical portion.

20. The apparatus of claim 11, wherein:

the torch includes an electrode, and an electrode-holder;

the structure of the torch is such that the electrode can be inserted into the electrode holder, and can be clamped or gripped therein by the action of rotating the electrode-holder relative to the torch handle;

and the structure of the torch is such that the rotatable accessory can be rotated about the torch-handle while the electrode-holder is held stationary relative to the torch-handle.

21. The apparatus of claim 20, wherein:

the structure of the torch is such that the electrode-holder can be screwed into and out of the torch-handle, arid such action is effective to tighten and loosen the electrode in the electrode-holder, respectively;

the electrode holder is so structured that the electrode, when tightened into the electrode-holder, lies substantially radially with respect to the axis of the torch-handle.

22. The apparatus of claim 20 wherein:

the action of rotating the electrode-holder relative to the torch-handle, to clamp or grip the electrode therein, takes place about an electrode-holder axis;

and the electrode-holder axis is co-axial with the rotation-axis of the accessory.

23. The apparatus of claim 20, wherein the structure of the torch is such that:

in respect of a first occasion of operation of the torch, the electrode lies at a first electrode-orientation angle relative to the torch-handle, and the accessory can be rotated to, and left at, a first accessory-orientation angle relative to the torch-handle;

in respect of a second occasion of operation of the torch, the electrode lies at a second, different, electrode-orientation angle relative to the torch-handle, and the accessory can be rotated to, and left at, a second accessory-orientation angle relative to the torch handle.

24. The apparatus of claim 23, wherein:

when the electrode lies at the first electrode-orientation angle relative to the torch-handle, and the accessory lies at the first accessory-orientation angle relative to the torch-handle, the accessory thereby lies oriented at a first electrode-accessory-orientation angle relative to the electrode; and when the electrode lies at the second electrode-orientation angle relative to the torch-handle, and the accessory lies at the second, different, accessory-orientation angle relative to the torch-handle, the accessory thereby lies orientated at a second electrode-accessory-orientation angle relative to the electrode;

the structure of the torch is such that the first electrode-accessory-orientation angle can be made equal, by hand manipulation of the accessory, to the second electrode-accessory-orientation angle.

25. An apparatus including a welding torch, having a service cable, wherein:

the torch includes a torch-handle, and includes an accessory mounted on the torch-handle;

wherein the torch-handle includes a cylindrical portion, which is suitable for being gripped by a person, and a rotation-axis which is co-axial with the axis of the cylindrical portion;

the accessory, so mounted, is guided on the torch-handle for rotation about a rotation-axis of the torch-handle;

the accessory is functionally operable, and its manner of operation is such that the efficacy thereof is substantially affected by the orientation of the accessory relative to the torch-handle;

a stator-ring is fixedly secured to the torch handle;

a rotor-ring is fixedly secured to the accessory;

the stator-ring and the rotor-ring are so structured, mutually, that the rotor-ring is guided for, and constrained against, all modes of movement relative to the stator-ring, other than rotation about the rotation-axis of the torch-handle;

the accessory includes a detent mechanism, which defines N detent-orientations of the rotor-ring upon the stator-ring;

in respect of each one of the N detent-orientations;

when the rotor-ring lies at the detent-orientation, the detent mechanism provides a heavy resistance to rotational movement of the rotor-ring away from the detent-orientation;

when the rotor-ring lies close to the detent-orientation, the detent mechanism provides a large resistance to rotational movement of the rotor-ring in the direction away from the detent-orientation, and provides a small, or negative, resistance to rotational movement of the rotor-ring in the direction towards the detent-orientation;

wherein the torch includes an electrode, and an electrode-holder;

the structure of the torch is such that the electrode can be inserted into the electrode holder, and can be clamped or gripped therein by the action of rotating the electrode-holder relative to the torch-handle;

and the structure of the torch is such that the rotatable accessory can be rotated about the torch-handle while the electrode-holder is held stationary relative to the torch-handle;

the structure of the torch is such that the electrode-holder can be screwed into and out of the torch-handle, and such action is effective to tighten and loosen the electrode in the electrode-holder, respectively;

the electrode holder is so structured that the electrode, when tightened into the electrode-holder, lies substantially radially with respect to the axis of the torch-handle;

the action of rotating the electrode-holder relative to the torch-handle, to clamp or grip the electrode therein, takes place about an electrode-holder axis;

the electrode-holder axis is co-axial with the rotation-axis of the accessory;

the accessory comprises an over-handle, fixedly secured to the rotor-ring;

the over-handle extends outwards and rearwards from the rotor-ring;

the over-handle overlies, and is spaced from, the torch-handle;

the over-handle is so disposed in relation to the torch-handle as to create a space between the torch-handle and an undersurface of the over-handle;

the space thus created is so shaped and sized as to be capable of, and suitable for, receiving the first web area of the hand of a person, into that space, the first web area being the webbed area between the thumb and the forefinger;

the configuration of the space created between the torch-handle and the over-handle is such that, when the first web area of the hand is located in the said space, the first web area is gripped between the torch-handle and the over-handle securely enough that the person can manipulate and manhandle the torch, with the service cable attached, substantially without exerting any muscular squeeze or grip on the torch-handle.

26. An apparatus including a welding torch, having a cables wherein:

the torch includes a torch-handle, and includes an accessory mounted on the torch-handle;

the accessory, so mounted, is guided on the torch-handle for rotation about a rotation-axis of the torch-handle, wherein the rotatable accessory comprises a pick;

the accessory is functionally operable, and its manner of operation is such that the efficacy thereof is substantially affected by the orientation of the accessory relative to the torch-handle;

a stator-ring is fixedly secured to the torch handle;

a rotor-ring is fixed to secured to the accessory;

the stator-ring and the rotor-ring are so structured, mutually, that the rotor-ring is guided for, and constrained against, all modes of movement relative to he stator-ring, other than rotation about the rotation-axis of the torch-handle;

the accessory includes a detent mechanism, which defines N detent-orientations of the rotor-ring upon the stator-ring;

in respect of each one of the N detent-orientations;

when the rotor-ring lies at the detent-orientation, the detent mechanism provides a heavy resistance to rotational movement of the rotor-ring away from the detent-orientation;

when the rotor-ring lies close to the detent-orientation, the detent mechanism provides a large resistance to rotational movement of the rotor-ring in the direction away from the detent-orientation, and provides a small, or negative, resistance to rotational movement of the rotor-ring in the direction towards the detent-orientation.

27. The apparatus of claim 26, wherein, in respect to each one of the N detent-orientations, the said heavy resistance;

is weak enough that the rotor-ring can be rotated, against the heavy resistance, by hand manipulation, away from the detent-orientation; and, is strong enough, in the absence of hand manipulation thereof, to hold the rotor-ring, with the accessory secured thereto, at the detent-orientation.

28. The apparatus of claim 26, wherein:

the stator-ring includes N indentations, respective to the N detent-orientations;

the rotor-ring includes a ball and spring assembly, which is so structured that, upon the rotor-ring being rotated upon the stator-ring, the ball enters into, and rises out of, the N indentations, one by one, being urged into the indentations by action of the spring.

29. The apparatus of claim 26, wherein the detent-orientations are equally pitched circumferentially about the stator-ring, and the number N is about twenty.

30. The apparatus of claim 26, wherein the torch-handle includes a cylindrical portion, which is suitable for being gripped by a person, and the rotation-axis is co-axial with the axis of the cylindrical portion.

31. The apparatus of claim 26, wherein:

the torch includes an electrode, and an electrode-holder;

the structure of the torch is such that the electrode can be inserted into the electrode holder, and can be clamped or gripped therein by the action of rotating the electrode-holder relative to the torch handle;

and the structure of the torch is such that the rotatable accessory can be rotated about the torch-handle while the electrode-holder is held stationary relative to the torch-handle.

32. The apparatus of claim 31, wherein:

the structure of the torch is such that the electrode-holder can be screwed into and out of the torch-handle, and such action is effective to tighten and loosen the electrode in the electrode-holder, respectively;

the electrode holder is so structured that the electrode, when tightened into the electrode-holder, lies substantially radially with respect to the axis of the torch-handle.

33. The apparatus of claim 31, wherein:

the action of rotating the electrode-holder relative to the torch-handle, to clamp or grip the electrode therein, takes place about an electrode-holder axis;

and the electrode-holder axis is co-axial with the rotation-axis of the accessory.

34. The apparatus of claim 31, wherein the structure of the torch is such that:

in respect of a first occasion of operation of the torch, the electrode lies at a first electrode-orientation angle relative to the torch-handle, and the accessory can be rotated to, and left at, a first accessory-orientation angle relative to the torch-handle;

in respect of a second occasion of operation of the torch, the electrode lies at a second, different, electrode-orientation angle relative to the torch-handle, and the accessory can be rotated to, and left at, a second accessory-orientation angle relative to the torch handle.

35. The apparatus of claim 34, wherein:

when the electrode lies at the first electrode-orientation angle relative to the torch-handle, and the accessory lies at the first accessory-orientation angle relative to the torch-handle, the accessory thereby lies oriented at a first electrode-accessory-orientation angle relative to the electrode; and when the electrode lies at the second electrode-orientation angle relative to the torch-handle, and the accessory lies at the second, different, accessory-orientation angle relative to the torch-handle, the accessory thereby lies orientated at a second electrode-accessory-orientation angle relative to the electrode;

the structure of the torch is such that the first electrode-accessory-orientation angle can be made equal, by hand manipulation of the accessory, to the second electrode-accessory-orientation angle.

* * * * *